(12) United States Patent
Tanaka et al.

(10) Patent No.: US 7,859,591 B2
(45) Date of Patent: Dec. 28, 2010

(54) ELECTRONIC APPARATUS AND CAMERA MODULE UNIT

(75) Inventors: Hiroyuki Tanaka, Kawasaki (JP);
Yoshifumi Kajiwara, Kawasaki (JP);
Hiroaki Sakashita, Kawasaki (JP);
Yoshiya Matsumoto, Kawasaki (JP);
Kazunori Murayama, Kawasaki (JP);
Atsuko Yamamoto, Kawasaki (JP);
Takehisa Ishikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 405 days.

(21) Appl. No.: 11/954,952

(22) Filed: Dec. 12, 2007

(65) Prior Publication Data

US 2008/0143870 A1 Jun. 19, 2008

(30) Foreign Application Priority Data

Dec. 15, 2006 (JP) ............................. 2006-339258

(51) Int. Cl.
*H04N 5/225* (2006.01)
*G03B 17/02* (2006.01)
*H05K 9/00* (2006.01)

(52) U.S. Cl. ..................... 348/373; 348/374; 348/376; 396/535; 361/816

(58) Field of Classification Search ................. 348/373, 348/333.01, 374, 376; 439/331; 396/535; 361/816

See application file for complete search history.

(56) References Cited

U.S. PATENT DOCUMENTS

| 6,939,172 | B2 * | 9/2005 | Lu ........................... 439/607.2 |
| 7,112,083 | B2 * | 9/2006 | Nishio et al. ................. 439/331 |
| 7,288,003 | B2 * | 10/2007 | Ono et al. .............. 439/607.01 |
| 7,636,124 | B2 * | 12/2009 | Yoo et al. .................... 348/373 |
| 2005/0094016 | A1 * | 5/2005 | Saitoh et al. ........... 348/333.01 |

FOREIGN PATENT DOCUMENTS

| JP | 2003-283176 A | 10/2003 |
| WO | 03-081972 A1 | 10/2003 |

* cited by examiner

*Primary Examiner*—David L Ometz
*Assistant Examiner*—Quang V Le
(74) *Attorney, Agent, or Firm*—Fujitsu Patent Center

(57) ABSTRACT

A camera module unit includes a printed wiring board overlaid on a shielding enclosure. A camera module is supported on the surface of the shielding enclosure. The camera module is located inside a recess defined in the printed wiring board. A shielding metal plate covers over the camera module. An elastic piece is defined in the shielding metal plate. The elastic piece is resiliently received on the surface of the shielding enclosure. The shielding metal plate realizes a sufficient shielding for the camera module in the camera module unit. Electric current is allowed to easily run from the charged shielding metal plate to the shielding enclosure through the elastic piece. The camera module is supported on the shielding enclosure inside the recess. The height of the camera module is reduced above the printed wiring board.

4 Claims, 9 Drawing Sheets

ELECTRONIC APPARATUS AND CAMERA MODULE UNIT

BACKGROUND OF THE INVENTION

1. Field of the Invention

The present invention relates to a camera module unit incorporated in an electronic apparatus such as a cellular or mobile phone terminal.

2. Description of the Prior Art

A cellular or mobile phone terminal equipped with a camera is well known. A printed circuit board is incorporated within the enclosure of the mobile phone terminal. Various electronic components or devices are mounted on a printed wiring board in the printed circuit board. The camera module is mounted on the printed wiring board.

A severe shielding structure is required for a camera module. The shielding structure of the camera module should be connected to a main ground on the printed wiring board. The camera module is supported on a spring contact mounted on the printed wiring board. The camera module inevitably reaches a higher level above the surface of the printed wiring board.

SUMMARY OF THE INVENTION

It is accordingly an object of the present invention to provide a camera module unit efficiently assembled within the enclosure of an electronic apparatus.

According to the present invention, there is provided a camera module unit comprising: a shielding enclosure; a printed wiring board overlaid on the shielding enclosure; a camera module supported on the surface of the shielding enclosure, the camera module located inside a recess defined in the printed wiring board; a shielding metal plate covering over the camera module; and an elastic piece defined in the shielding metal plate, the elastic piece being resiliently received on the surface of the shielding enclosure.

The shielding metal plate realizes a sufficient shielding for the camera module in the camera module unit. Electric current is allowed to easily run from the charged shielding metal plate to the shielding enclosure through the elastic piece. The camera module is thus reliably protected from electrification. In addition, the camera module is placed inside the recess defined in the printed wiring board. The camera module is supported on the shielding enclosure inside the recess. Accordingly, the height of the camera module is reduced above the printed wiring board. The camera module is efficiently assembled within the enclosure of an electronic apparatus. The enclosure is prevented from an increase in the thickness.

An electrically conductive elastic member may be interposed between the camera module and the shielding enclosure in the camera module unit. The electrically conductive elastic member allows electrical current to run into the shielding enclosure from the camera module. The camera module is thus reliably prevented from electrification.

The camera module can be employed in an electronic apparatus such as a cellular or mobile phone terminal. In this case, the electronic apparatus may comprise: a primary enclosure; a shielding enclosure placed within the primary enclosure; a printed wiring board overlaid on the shielding enclosure within the primary enclosure; a camera module supported on the surface of the shielding enclosure, the camera module located inside a recess defined in the printed wiring board; a shielding metal plate covering over the camera module; and an elastic piece defined in the shielding metal plate, the elastic piece being resiliently received on the surface of the shielding enclosure.

BRIEF DESCRIPTION OF THE DRAWINGS

The above and other objects, features and advantages of the present invention will become apparent from the following description of the preferred embodiment in conjunction with the accompanying drawings, wherein.

DESCRIPTION OF THE PREFERRED EMBODIMENT

Figure 1:
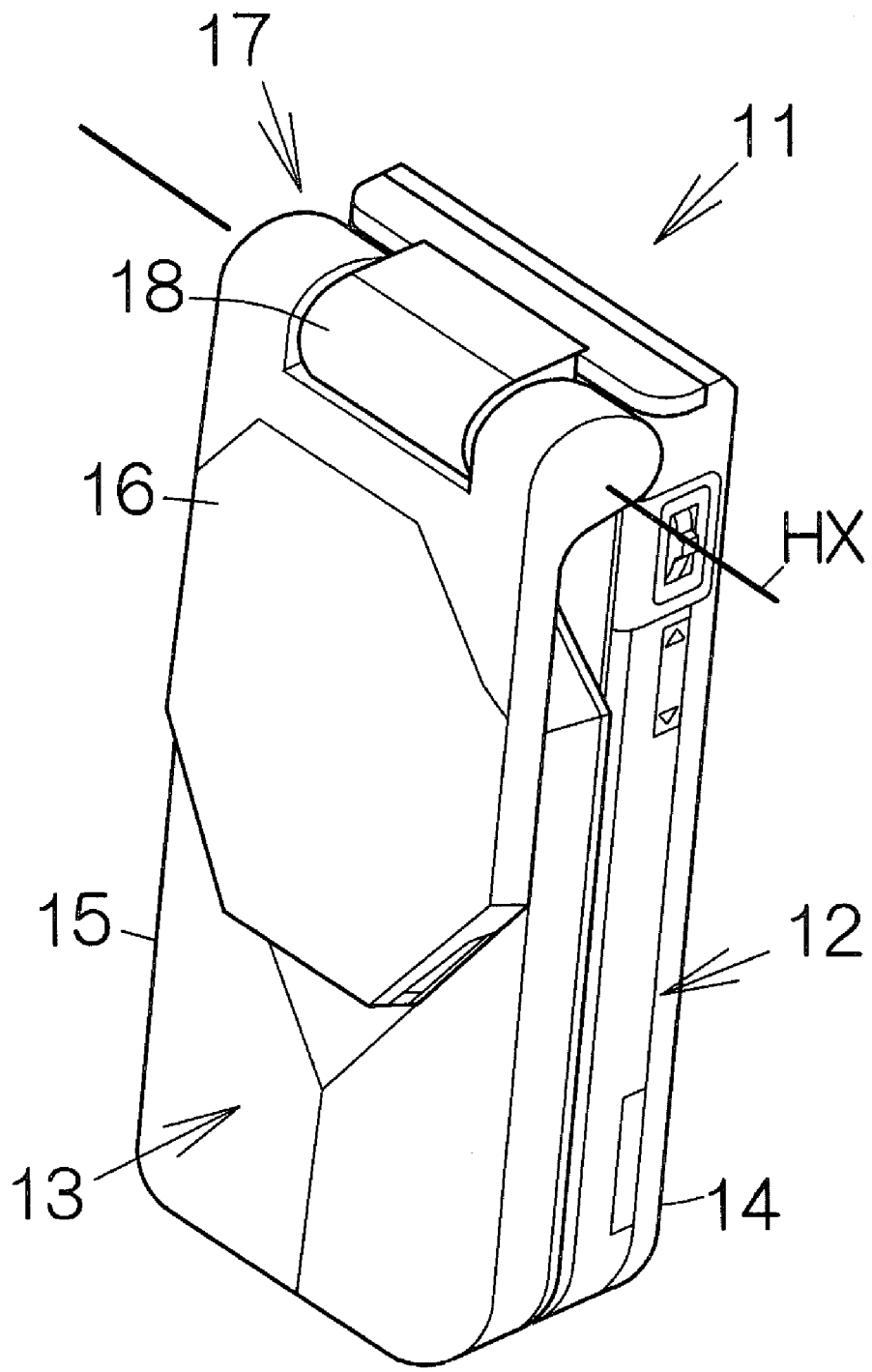
FIG. 1 is a perspective view schematically illustrating a cellular or mobile phone terminal of the clamshell type according to an embodiment of the present invention.

FIG. 1 schematically illustrates a cellular or mobile phone terminal 11 of the clamshell type as an example of an electronic apparatus according to an embodiment of the present invention. The mobile phone terminal 11 includes a main apparatus 12 and a display unit 13. The main apparatus 12 includes a main body enclosure 14 serving as a first enclosure. A printed circuit board unit is incorporated in the main body enclosure 14, as described later in detail. Processing circuits, such as a central processing unit (CPU) and a memory, are mounted on a printed wiring board in the printed circuit board unit in a conventional manner. The main body enclosure 14 may be molded from a reinforced resin material such as acrylonitrile butadiene styrene (ABS), for example.

The display unit 13 includes a display enclosure 15 serving as a second enclosure. The display enclosure 15 can be superposed on the flat front surface of the main body enclosure 14. The front surface of the display enclosure 15 meets with the front surface of the main body enclosure 14. The contour of the display enclosure 15 matches that of the main body enclosure 14. The front surface of the display enclosure 15 is thus entirely covered with the main body enclosure 14. The display enclosure 15 may be molded from a reinforced resin material such as acrylonitrile butadiene styrene (ABS), for example.

A hinge bracket 16 is coupled to the display enclosure 15. The hinge bracket 16 is also coupled to the main body enclosure 14. A first coupling mechanism 17 is utilized to couple the hinge bracket 16 to the main body enclosure 14. The first coupling mechanism 17 includes a hinge 18. The hinge 18 serves to realize relative rotation between the main body enclosure 14 and the hinge bracket 16 around a first rotation axis HX. The hinge bracket 16 is thus coupled to the main body enclosure 14 for relative rotation around the first rotation axis HX. As is apparent from FIG. 2, the first rotation axis HX is designed to extend along a line parallel to the flat front surface of the main body enclosure 14. The hinge bracket 16 is allowed to change from a closed attitude to an opened attitude. When the hinge bracket 16 takes the closed attitude, the display enclosure 15 is superposed on the flat front surface of the main body enclosure 14. When the hinge bracket 16 takes the opened attitude, the display enclosure 15 is flipped to open relative to the main body enclosure 14 through the rotation around the first rotation axis HX. The display enclosure 15 thus changes the attitude between the closed attitude and the opened attitude.

Figure 2:
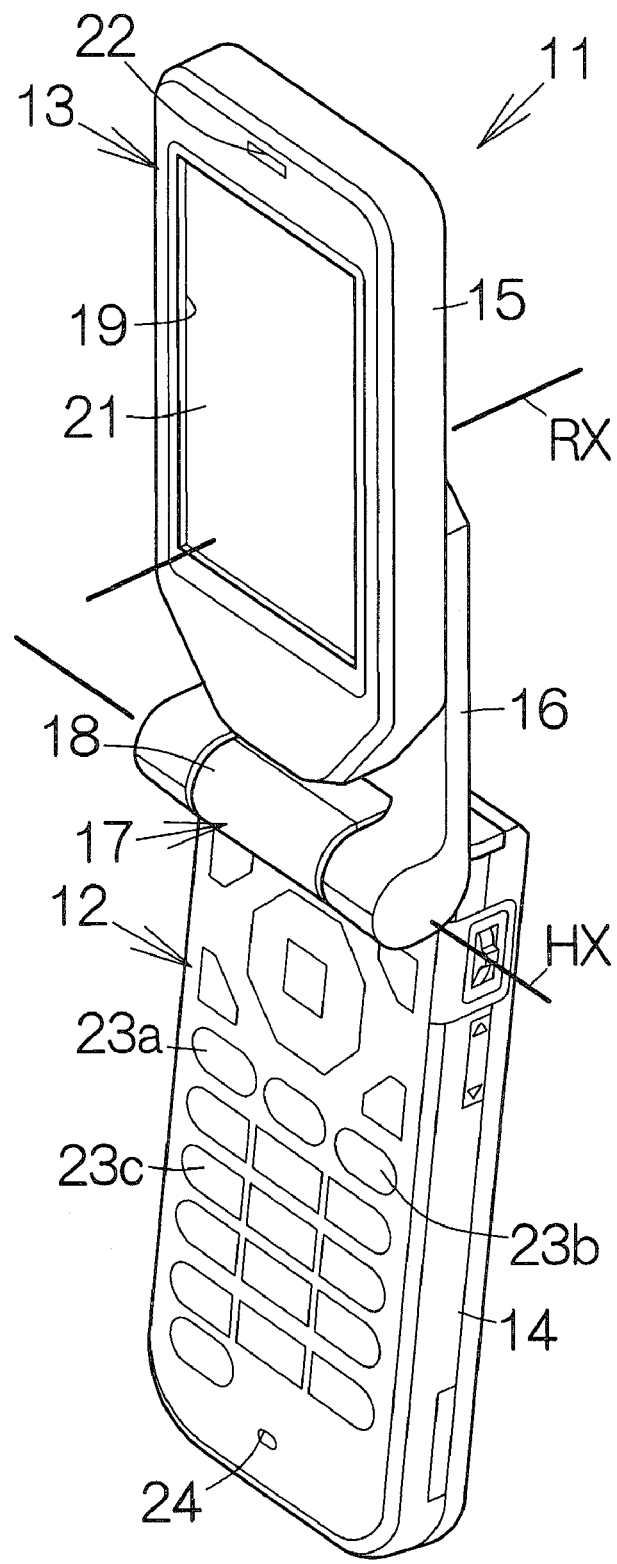
FIG. 2 is a perspective view of the mobile phone terminal for schematically illustrating a display enclosure set in an opened attitude.

As shown in FIG. 2, a rectangular window opening 19 is defined in the front surface of the display enclosure 15. A flat display panel such as a liquid crystal display (LCD) panel 21 is incorporated in the display enclosure 15. The screen of the LCD panel 21 is placed within the window opening 19. Various texts and graphics are displayed on the screen of the LCD panel 21 in response to the operation of the CPU. A speaker hole 22 is defined in the front surface of the display enclosure 15. A speaker is placed within the speaker hole 22. The speaker reproduces the voice of the other party during telephone conversation.

Keypads, such as an on-hook keypad 23a, an off-hook keypad 23b, numeric keypads 23c, and the like, are embedded in the flat front surface of the main apparatus 12. The CPU executes various processing in response to the manipulation of the keypads. A microphone hole 24 is defined in the flat front surface of the main body enclosure 14. A microphone is placed within the microphone hole 24. The user of the mobile phone terminal 11 speaks to the microphone for telephone conversation.

The hinge bracket 16 supports or receives the back surface of the display enclosure 15. The back surface of the display enclosure 15 meets with the front surface of the hinge bracket 16. The display enclosure 15 is coupled to the hinge bracket 16 for relative rotation around a second rotation axis RX. The second rotation axis RX is designed to extend within an imaginary plane perpendicular to the first rotation axis HX. The second rotation axis RX is also designed to intersect with the surface of the hinge bracket 16. Here, the intersecting angle is set at 90 degrees. The display enclosure 15 is in this manner allowed to rotate relative to the main body enclosure 14 around the first rotation axis HX.

When the mobile phone terminal 11 is set in an opened attitude, the main apparatus 12 and the display unit 13 face front. A portrait screen is established in the LCD panel 21 while the main apparatus 12 is set in a vertical attitude. The user of the mobile phone terminal 11 is allowed to look at the keypads such as the numeric keypads 23c while he/she keeps looking at the portrait screen of the LCD panel 21. The display enclosure 15 is rotatable around the first rotation axis HX. Such a rotation of the display enclosure 15 enables superposition of the display enclosure 15 on the flat front surface of the main body enclosure 14. The mobile phone terminal 11 thus takes a closed attitude. The mobile phone terminal 11 is set in a folded state in this manner.

Figure 3:
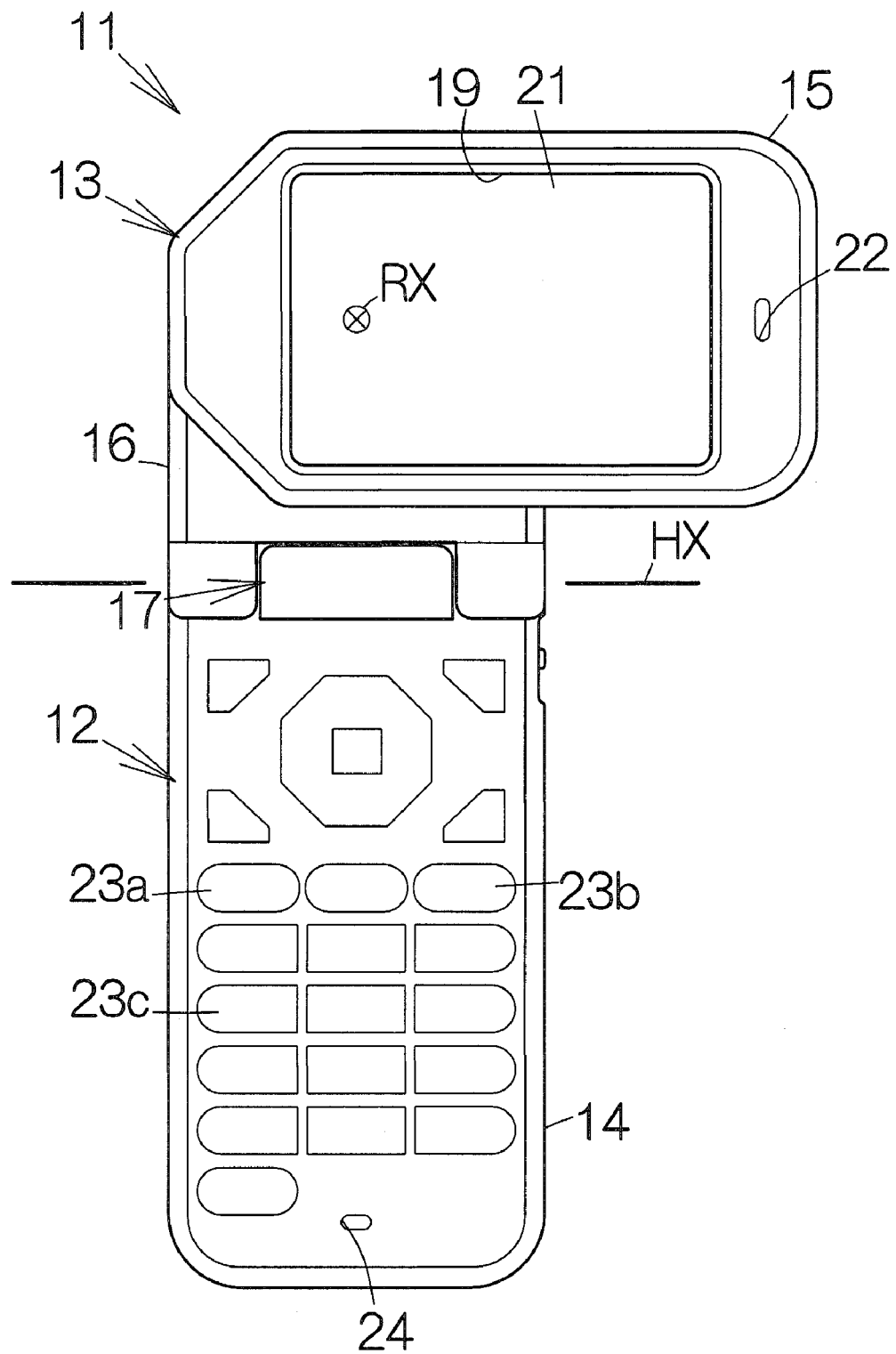
FIG. 3 is a front view of the mobile phone terminal for schematically illustrating the display enclosure rotating in the normal direction by 90 degrees around a second rotation axis during establishment of the opened attitude of the display enclosure.
Figure 4:
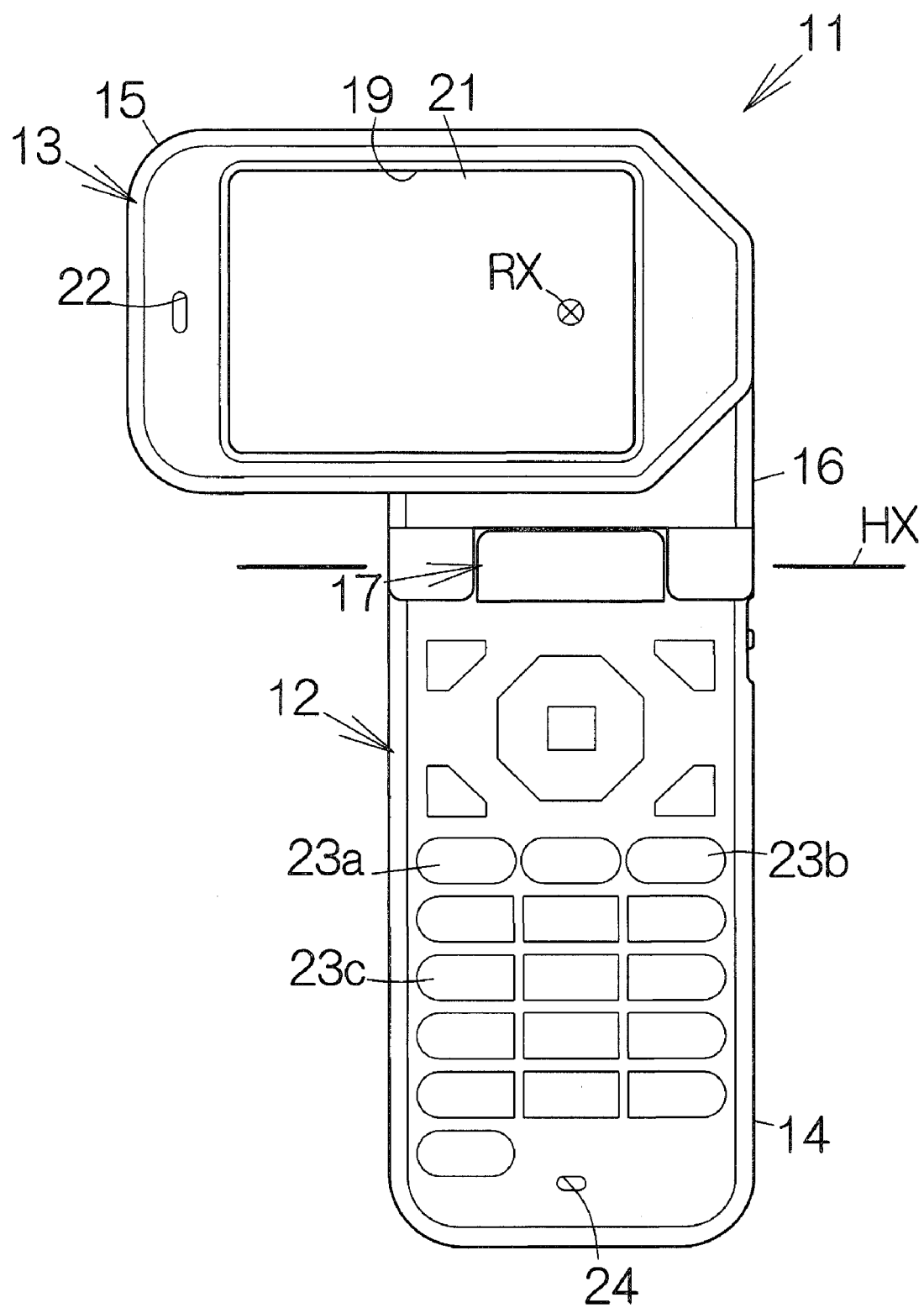
FIG. 4 is a front view of the mobile phone terminal for schematically illustrating the display enclosure rotating in the reverse direction by 90 degrees around the second rotation axis during establishment of the opened attitude of the display enclosure.

When the mobile phone terminal 11 takes the opened attitude, the display enclosure 15 is allowed to rotate around the second rotation axis RX, for example. When the display enclosure 15 rotates in the clockwise direction, namely in a first direction, by the rotation angle of 90 degrees, from the upright attitude where the LCD panel 21 provides the portrait screen, as shown in FIG. 3, the display enclosure 15 takes a first pivotal attitude. The landscape screen is established in the LCD panel 21. When the display enclosure 15 rotates in the anticlockwise direction, namely in a second direction, by the rotation angle of 90 degrees, from the upright attitude, the display enclosure 15 takes a second pivotal attitude, as shown in FIG. 4. The landscape screen is established in the LCD panel 21.

Figure 5:
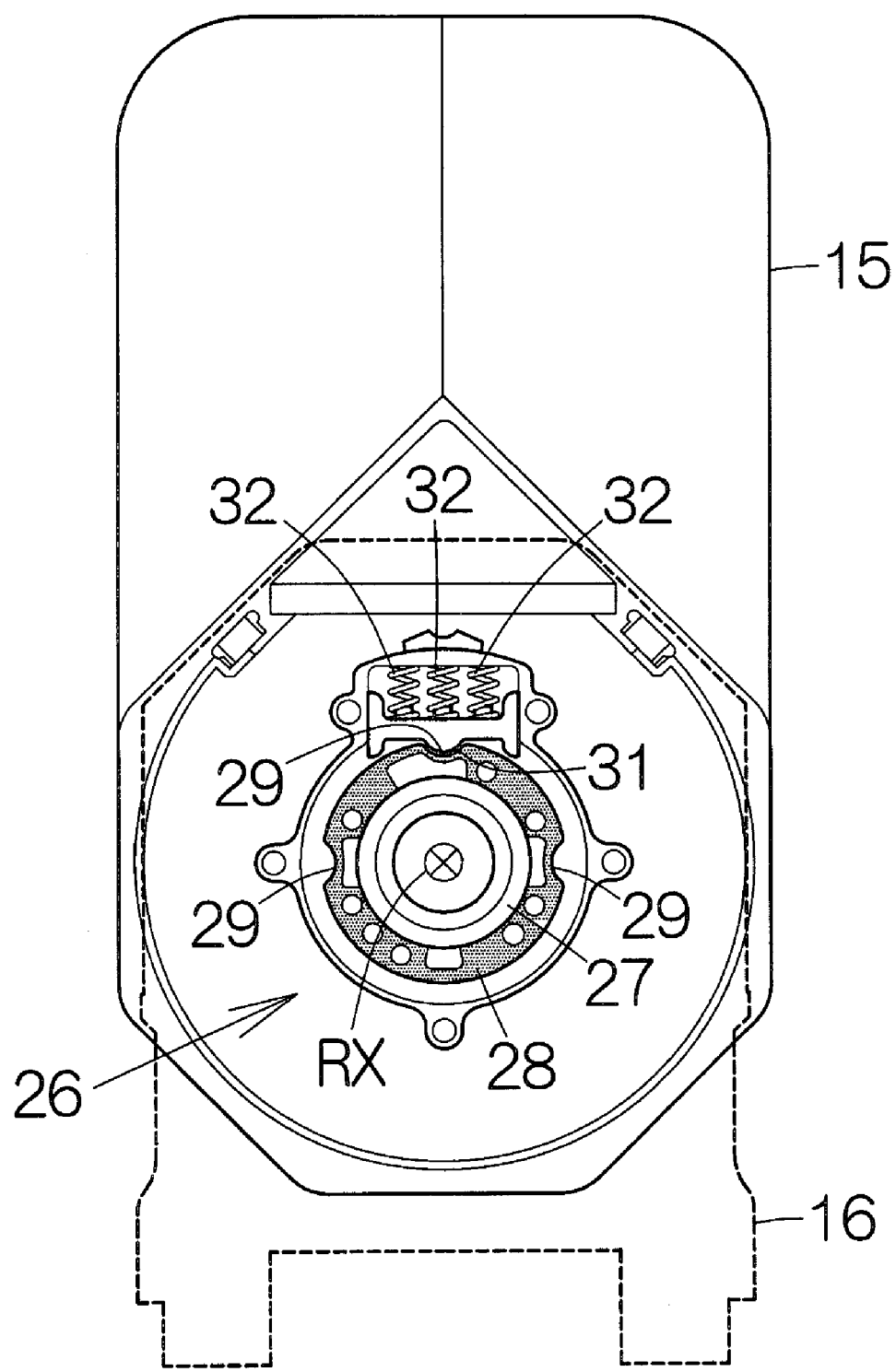
FIG. 5 is a plan view schematically illustrating a second coupling mechanism on the back surface of the display enclosure.

As shown in FIG. 5, a second coupling mechanism 26 is incorporated in the back surface of the display enclosure 15. The second coupling mechanism 26 includes a hollow cylindrical shaft 27 designed to extend concentrically with the second rotation axis RX. The hollow cylindrical shaft 27 is stationarily fixed to the display enclosure 15. An annular member 28 is mounted on the hollow cylindrical shaft 27 for relative rotation around the hollow cylindrical shaft 27. The annular member 28 is prevented from an axial movement relative to the hollow cylindrical shaft 27. Specifically, the annular member 28 is prevented from falling off. The hinge bracket 16 is fixed to the annular member 28. Relative rotation is restrained between the hinge bracket 16 and the annular member 28 around the hollow cylindrical shaft 27. Relative rotation between the hollow cylindrical shaft 27 and the annular member 28 thus enables relative rotation between the display enclosure 15 and the hinge bracket 16.

Three depressions 29 are formed on the outer periphery of the annular member 28 at constant intervals of the central angle of 90 degrees. The depressions 29 are depressed toward the central axis of the hollow cylindrical shaft 27, namely the second rotation axis RX. The depressions 29 are respectively defined based on arched edges of the annular member 28, for example. An arched protrusion 31 is opposed to the outer periphery of the annular member 28. Three tensile springs 32 are utilized to urge the protrusion 31 toward the central axis of the hollow cylindrical shaft 27, namely the second rotation axis RX, for example. The protrusion 31 is received in one of the depressions 29. The combination of the protrusion 31 and the depressions 29 in this manner serves to restrain the relative rotation between the display enclosure 15 and the hinge bracket 16 at a desired position. The display enclosure 15 in this manner clicks on the hinge bracket 16 around the second rotation axis RX.

Figure 6:
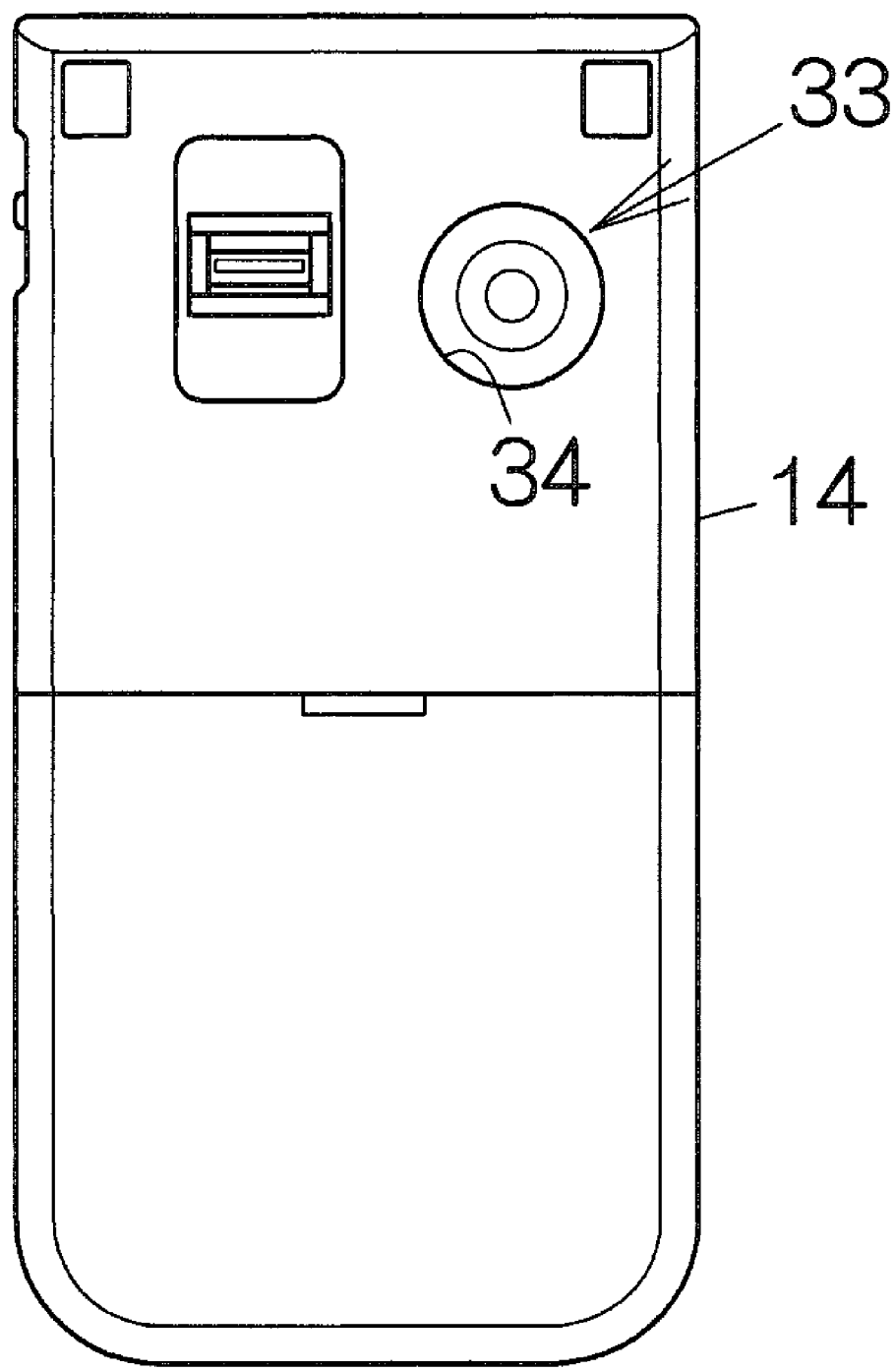
FIG. 6 is a backside view of the mobile phone terminal.

As shown in FIG. 6, a camera module 33 is incorporated in the main body enclosure 14. The camera module 33 includes a camera lens placed within an opening 34 defined in the main body enclosure 14. A transparent plastic cover is fitted in the opening 34. An imaging element in the camera module 33 captures an image through the camera lens. The captured image can be displayed on the screen of the LCD panel 21, for example.

Figure 7:
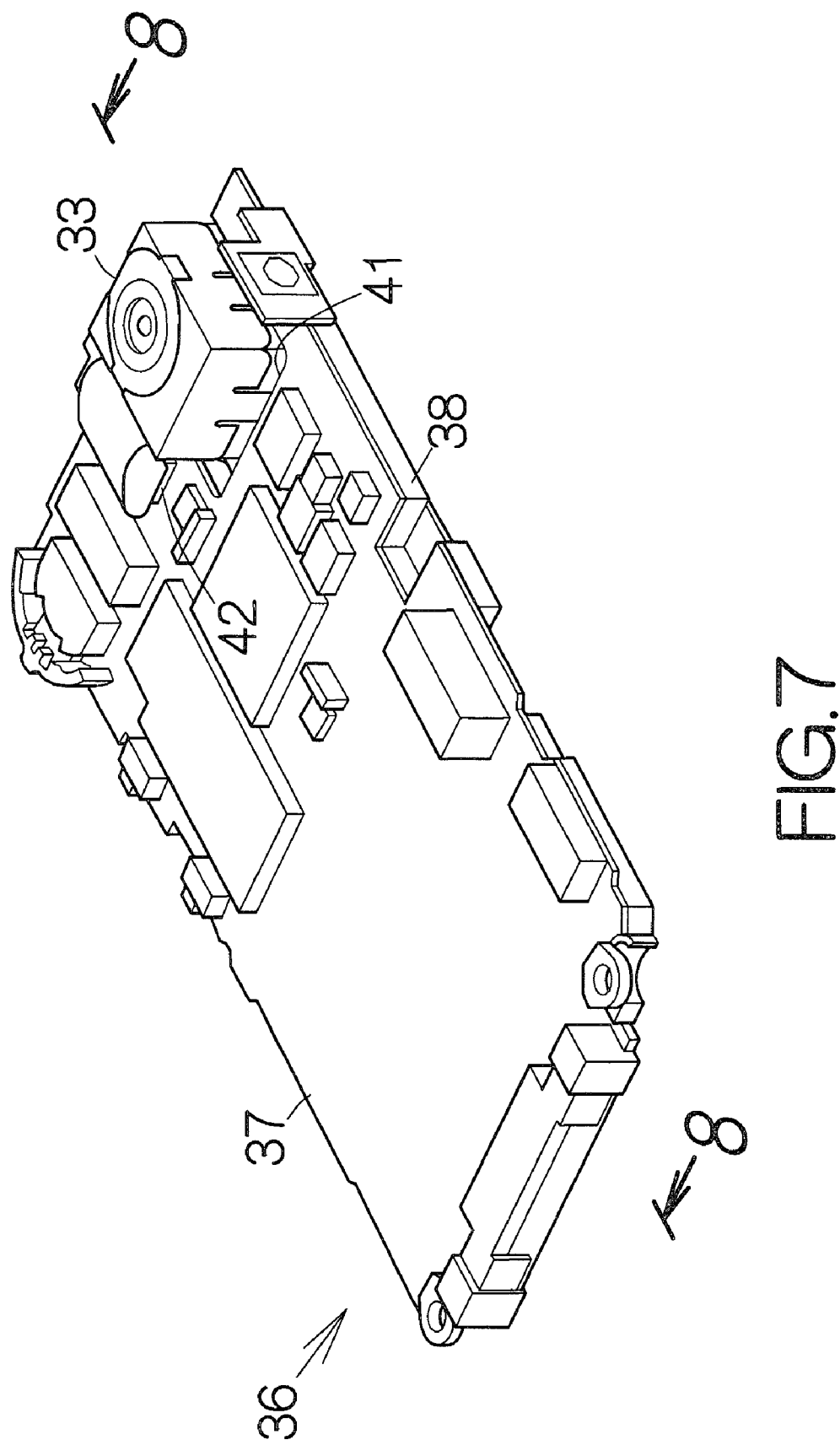
FIG. 7 is a perspective view schematically illustrating a camera module unit.

A printed circuit board unit is incorporated in the main body enclosure 14. As shown in FIG. 7, the printed circuit board unit 36 includes a printed wiring board 37 and a shielding enclosure 38. The printed wiring board 37 is overlaid on the shielding enclosure 38. The contour of the printed wiring board 37 mostly coincides with that of the shielding enclosure 38. The camera module 33 is mounted on the shielding enclosure 38. A recess 41 is defined in the printed wiring board 37. The camera module 33 is located inside the recess 41. A connector 42 of the camera module 33 is coupled to a receiving connector mounted on the surface of the printed wiring board 37. Here, the printed circuit board unit 36 and the camera module 33 in combination provide a camera module unit according to the present invention. The camera module unit is received or supported on the lower half of the main body enclosure 14. The printed wiring board 37 is opposed to the bottom plate of the lower half. The camera module 33 is urged against the back surface of the plastic cover inside the opening 34. When the upper half of the main body enclosure 14 is coupled to the lower half, the camera module unit is held between the upper half and the lower half.

Figure 8:
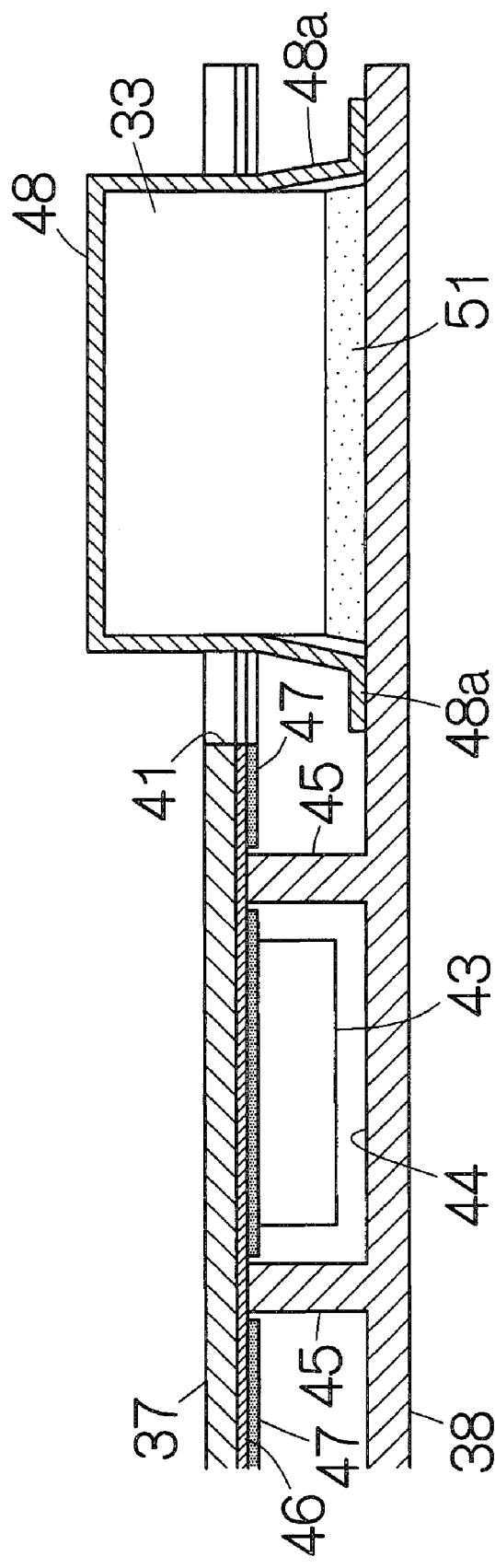
FIG. 8 is a sectional view taken along the line 8-8 in FIG. 7.

As shown in FIG. 8, the shielding enclosure 38 cooperates with the printed wiring board 37 for establishment of chambers 44. The chamber 44 is partitioned for a semiconductor chip 43 or a group of semiconductor chips 43. A wall or walls 45 are defined on the shielding enclosure 38. The walls 45 stand upright from the bottom plate of the shielding enclosure 38. The walls 45 surround the individual chamber 44. The top of the walls 45 contact with a ground layer 46 of the printed wiring board 37. An electrically conductive film is formed over the surface of the shielding enclosure 38. An insulating layer 47 is formed over the surface of the ground layer 46 at positions off the walls 45 and the semiconductor chip 43.

Figure 9:
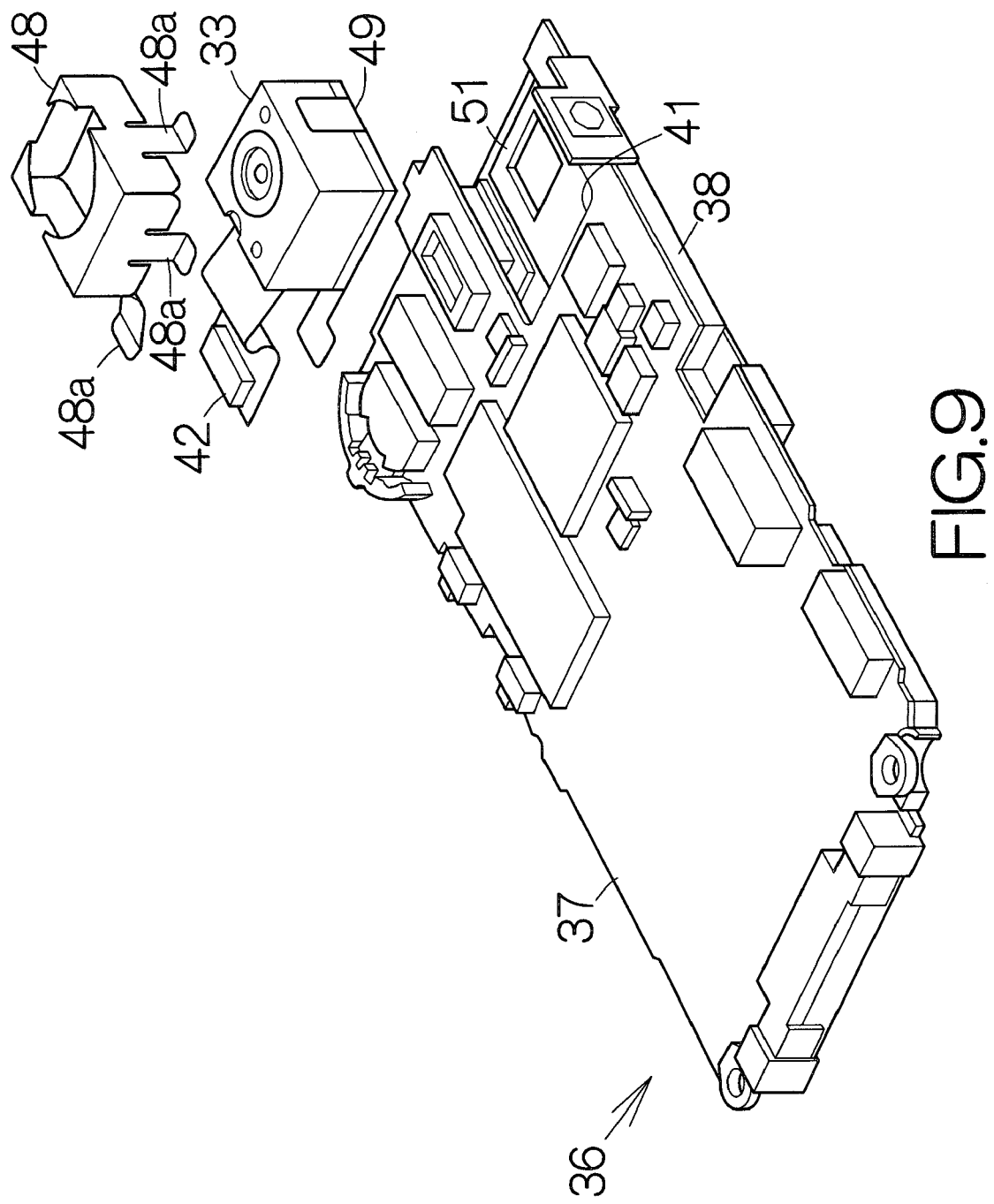
FIG. 9 is an exploded view of the camera module unit.

Referring also to FIG. 9, the camera module 33 is covered with a camera shielding 48. The camera shielding 48 may be made of a metal plate, such as a steel plate, for example. One or more elastic pieces 48a are defined in the camera shielding 48. The elastic pieces 48a have elasticity. Accordingly, when the camera module 33 is mounted on the bottom plate of the shielding enclosure 38, the elastic pieces 48a resiliently contact the shielding enclosure 38.

An electrically conductive seal 49 is adhered to the bottom of the camera module 33. The electrically conductive seal 49 is connected to the camera shielding 48. The camera module 33 is thus covered with an electrically conductive body over an area as much as possible. Moreover, when the camera module 33 is received on the bottom plate of the shielding enclosure 38, an electrically conductive elastic member 51 is interposed between the electrically conductive seal 49 and the shielding enclosure 38. The electrically conductive seal 49 is thus connected to the shielding enclosure 38. The electrically conductive elastic member 51 serves to transmit electric current from the camera module 33 to the shielding enclosure 38 in an efficient manner. The camera module 33 is reliably prevented from suffering from electrification. The electrically conductive elastic member 51 urges the camera module 33 against the plastic cover fitted in the opening 34.

The camera shielding 48 realizes a sufficient shielding for the camera module 33 in the camera module unit. Electric current is allowed to easily run from the charged camera shielding 48 to the shielding enclosure 38 through the elastic pieces 48a and the electrically conductive elastic member 51. The camera module 33 is reliably protected from electrification. In addition, the camera module 33 is placed inside the recess 41 defined in the printed wiring board 37. The camera module 33 is supported on the shielding enclosure 38 inside the recess 41. Accordingly, the height of the camera module 33 is reduced above the printed wiring board 37. The camera module 33 is efficiently assembled within the main body enclosure 14. The main body enclosure 14 is prevented from an increase in the thickness of the main body enclosure 14.

What is claimed is:

1. A camera module unit comprising:
   a shielding enclosure;
   a printed wiring board overlaid on the shielding enclosure;
   a camera module supported on a surface of the shielding enclosure, the camera module located inside a recess defined in the printed wiring board;
   a shielding metal plate covering over the camera module; and
   an elastic piece defined in the shielding metal plate, the elastic piece being resiliently received on the surface of the shielding enclosure.

2. The camera module unit according to claim 1, wherein an electrically conductive elastic member is interposed between the camera module and the shielding enclosure.

3. An electronic apparatus comprising:
   a primary enclosure;
   a shielding enclosure placed within the primary enclosure;
   a printed wiring board overlaid on the shielding enclosure within the primary enclosure;
   a camera module supported on a surface of the shielding enclosure, the camera module located inside a recess defined in the printed wiring board;
   a shielding metal plate covering over the camera module; and
   an elastic piece defined in the shielding metal plate, the elastic piece being resiliently received on the surface of the shielding enclosure.

4. The electronic apparatus according to claim 3, wherein an electrically conductive elastic member is interposed between the camera module and the shielding enclosure.

* * * * *